United States Patent
Okamoto et al.

(10) Patent No.: US 10,465,759 B2
(45) Date of Patent: Nov. 5, 2019

(54) PISTON FOR VEHICLE DISC BRAKE AND MANUFACTURING METHOD THEREOF

(71) Applicants: NISSIN KOGYO CO., LTD., Tomi, Nagano (JP); SHINSHU UNIVERSITY, Matsumoto-shi, Nagano (JP)

(72) Inventors: Minoru Okamoto, Nagano (JP); Yohei Takahashi, Nagano (JP); Susumu Arai, Nagano (JP); Miyoka Ueda, Hakuba-mura (JP)

(73) Assignees: NISSIN KOGYO CO., LTD., Tomi (JP); SHINSHU UNIVERSITY, Matsumoto-shi (JP)

( * ) Notice: Subject to any disclaimer, the term of this patent is extended or adjusted under 35 U.S.C. 154(b) by 108 days.

(21) Appl. No.: 15/547,445

(22) PCT Filed: Feb. 18, 2016

(86) PCT No.: PCT/JP2016/054763
§ 371 (c)(1),
(2) Date: Jul. 28, 2017

(87) PCT Pub. No.: WO2016/133176
PCT Pub. Date: Aug. 25, 2016

(65) Prior Publication Data
US 2018/0003252 A1    Jan. 4, 2018

(30) Foreign Application Priority Data
Feb. 19, 2015    (JP) .................... 2015-030966

(51) Int. Cl.
*F16D 65/18* (2006.01)
*C23C 18/52* (2006.01)
(Continued)

(52) U.S. Cl.
CPC .......... *F16D 65/18* (2013.01); *C23C 18/1653* (2013.01); *C23C 18/1662* (2013.01);
(Continued)

(58) Field of Classification Search
CPC .. F16D 65/18; F16D 65/0025; C23C 18/1653
(Continued)

(56) References Cited

U.S. PATENT DOCUMENTS 4,290,510 A * 9/1981 Warren ............... C23C 4/06
                                                  188/218 XL
4,808,275 A * 2/1989 Ohzora .............. C23C 26/02
                                                  188/218 XL
(Continued)

FOREIGN PATENT DOCUMENTS

JP    S58-146763 A    9/1983
JP    S61-246400 A    11/1986
(Continued)

OTHER PUBLICATIONS

Danninger ("7.6: Iron-Phosphorous Steel", 2005, Engineering360, globalspec.com; retrieved Jan. 7, 2019).*
(Continued)

*Primary Examiner* — Nathaniel E Wiehe
*Assistant Examiner* — Richard C Drake
(74) *Attorney, Agent, or Firm* — Oliff PLC

(57) ABSTRACT

A piston has a piston main body including an aluminum alloy, and a covering layer formed on the outer surface of the piston main body, and the covering layer has a first plating layer including an iron-phosphorous alloy, and a second plating layer including a nickel-phosphorous alloy formed on the first plating layer.

10 Claims, 2 Drawing Sheets

(51) Int. Cl.

| | |
|---|---|
| *C23C 28/02* | (2006.01) |
| *F16J 1/01* | (2006.01) |
| *F16J 9/26* | (2006.01) |
| *C25D 3/56* | (2006.01) |
| *C25D 5/12* | (2006.01) |
| *C25D 5/44* | (2006.01) |
| *C23C 18/16* | (2006.01) |
| *C23C 18/32* | (2006.01) |
| *F16D 121/04* | (2012.01) |
| *F16D 125/04* | (2012.01) |

(52) U.S. Cl.
CPC .............. *C23C 18/32* (2013.01); *C23C 18/52* (2013.01); *C23C 28/02* (2013.01); *C25D 3/562* (2013.01); *C25D 5/12* (2013.01); *C25D 5/44* (2013.01); *F16J 1/01* (2013.01); *F16J 9/26* (2013.01); *F16D 2121/04* (2013.01); *F16D 2125/04* (2013.01)

(58) Field of Classification Search
USPC .......................................................... 60/223
See application file for complete search history.

(56) References Cited

U.S. PATENT DOCUMENTS

| | | | | |
|---|---|---|---|---|
| 4,977,986 | A * | 12/1990 | Edwards | ............. F16D 65/0025 188/250 B |
| 6,769,518 | B2 * | 8/2004 | Uehara | .................. C25D 11/36 188/218 XL |
| 8,343,326 | B2 * | 1/2013 | Virnig | .................. C07C 309/10 205/94 |
| 8,459,421 | B2 * | 6/2013 | Tsujimi | .................. C25D 11/04 188/370 |
| 9,004,240 | B2 * | 4/2015 | Palumbo | ............... F16D 69/027 188/251 A |
| 10,197,121 | B2 * | 2/2019 | Filip | ........................ C23C 14/34 |
| 2003/0196906 | A1 * | 10/2003 | Kondo | ...................... C25D 3/12 205/271 |
| 2005/0183909 | A1 * | 8/2005 | Rau, III | ............. F16D 65/0006 188/218 XL |
| 2013/0064536 | A1 * | 3/2013 | Taki | ........................ G03B 17/14 396/419 |

FOREIGN PATENT DOCUMENTS

| | | |
|---|---|---|
| JP | H04-045280 A | 2/1992 |
| JP | 2704792 B2 | 1/1998 |
| JP | H11-063047 A | 3/1999 |
| JP | 2006-292119 A | 10/2006 |

OTHER PUBLICATIONS

Srinivasan et al. ("Studies on electroless nickel-PTFE composite coatings", Institute of Materials, Minerals, and Mining; 2005. retrieved from <URL> http://krc.cecri.res.in/ro_2005/99/2005.pdf on Jan. 7, 2019).*

Micro-ace ("Nickel Phosphorous Plating", 2012, retrieved from micro-ace.co.jp on Jan. 7, 2019).*

May 10, 2016 International Search Report issued in International Patent Application No. PCT/JP2016/054763.

Sep. 7, 2018 Search Report issued in European Patent Application No. 16752562.5.

* cited by examiner

[Fig.1]
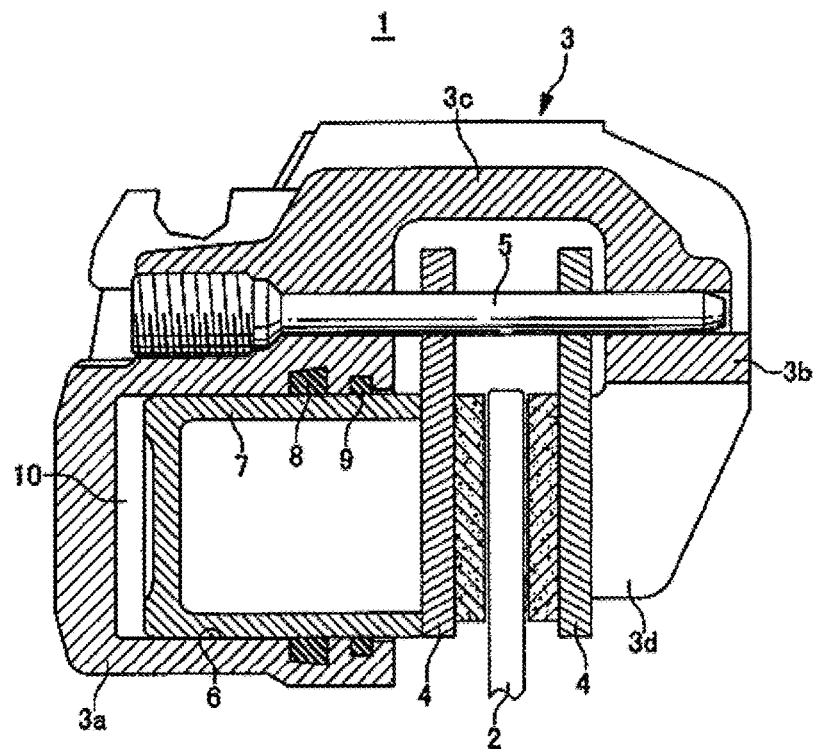
[Fig.2]
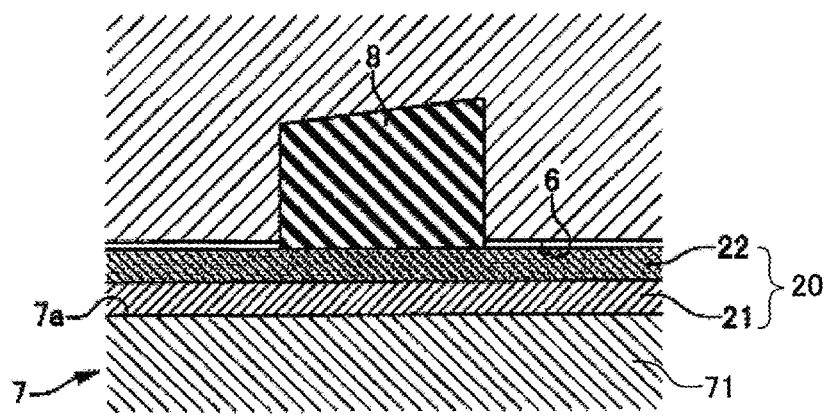

[Fig.3A]
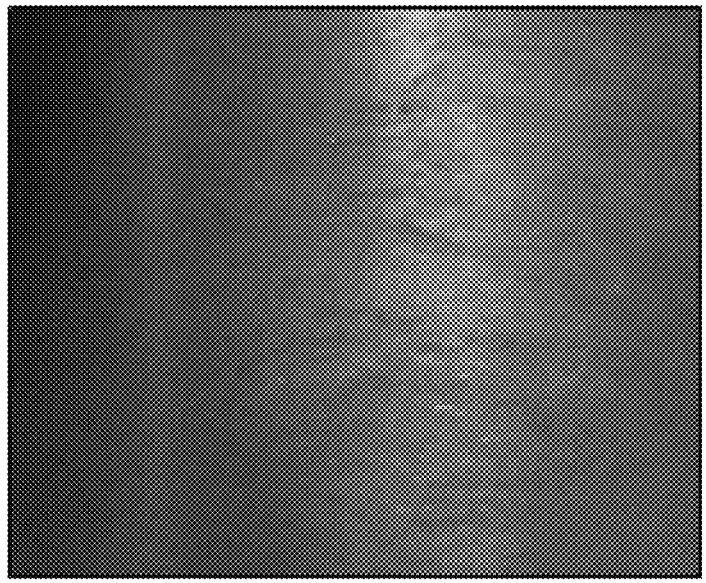
[Fig.3B]
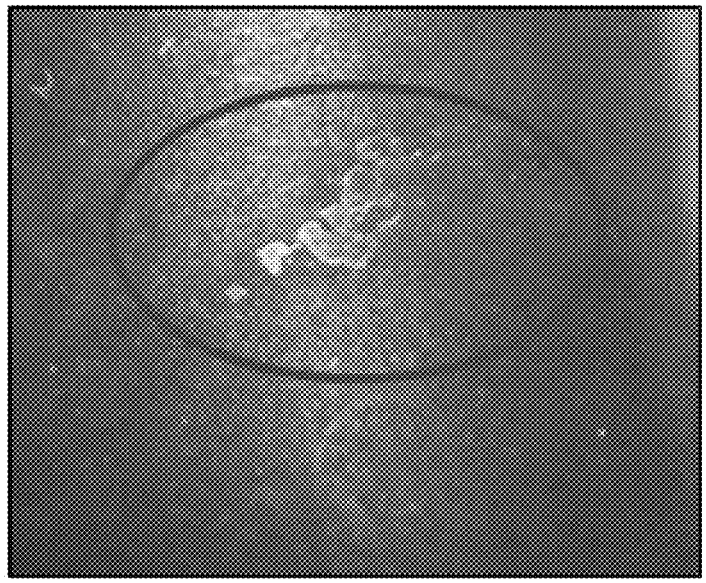

PISTON FOR VEHICLE DISC BRAKE AND MANUFACTURING METHOD THEREOF

TECHNICAL FIELD

The present invention relates to a piston for a vehicle disc brake and, more particularly, to a piston of aluminum alloy accommodated via a piston seal in a cylinder hole formed in a caliper body and a manufacturing method thereof.

BACKGROUND ART

The outer surface of a piston for a vehicle disc brake undergoes surface treatment to maintain good slidable characteristics with respect to a piston seal and improve operation feeling. Conventionally, there is a known technique for forming a chrome plating layer as this surface treatment. In recent years, there is proposed a technique for forming, on the outer peripheral surface of a piston, a composite plating layer made of nickel-phosphorous alloy including PTFE. This composite plating layer has the characteristics of both polytetrafluoroethylene (PTFE) and electroless nickel and holds good sliding characteristics between the piston and the piston seal (see, for example, PTL 1).

CITATION LIST

Patent Literature

PTL 1: JP-A-11-63047

SUMMARY OF INVENTION

Technical Problem

However, in the technique described in PTL 1, an electroless nickel-phosphorous composite plating layer that is a surface layer is formed on the outer surface of the piston via an electroless nickel-phosphorous plating layer that is a base layer. In this case, when the piston is made of aluminum alloy to reduce the weight of a vehicle body, if the piston is affected by braking heat, the difference in the heat expansion between the piston and the base layer may cause the base layer to peel off the piston.

An object of the invention is to provide a piston of aluminum alloy for a vehicle disc brake that has good strength and can improve operation feeling and a manufacturing method thereof.

Solution to Problem

According to the invention, there is provided a piston for a vehicle disc brake, the piston being accommodated via a piston seal in a cylinder hole formed in a caliper body of the vehicle disc brake so as to be movable in a disc shaft direction, the piston including
  a piston main body made of aluminum alloy and
  a covering layer formed on an outer surface of the piston main body,
  in which the covering layer includes a first plating layer made of iron-phosphorous alloy and a second plating layer made of nickel-phosphorous alloy, the second plating layer being formed on the first plating layer.
  The invention may further have the following aspects.
  The second plating layer may further include 10 to 30 volume percent of resin particles and the resin particles may be made of polytetrafluoroethylene (PTFE).

The first plating layer may have a film thickness of 1 to 15 μm and the second plating layer may have a film thickness of 1 to 15 μm.

According to the invention, there is provided a method for manufacturing a piston for a vehicle disc brake, the piston being accommodated via a piston seal in a cylinder hole formed in a caliper body of the vehicle disc brake so as to be movable in a disc shaft direction, the method including the steps of
  forming a first plating layer made of iron-phosphorous alloy on an outer surface of a piston main body made of aluminum alloy using electrolytic plating, the outer surface having undergone zincate treatment and
  forming a second plating layer made of nickel-phosphorous alloy on a surface of the first plating layer using electroless plating.
  The manufacturing method according to the invention may further have the following aspects.
  A plating solution including an iron compound, a phosphinic acid compound, and organic acid may be used in the process of forming the first plating layer.
  The organic acid may be glycine and L-ascorbic acid.
  The second plating layer may further include 10 to 30 volume percent of resin particles and the resin particles may be made of polytetrafluoroethylene (PTFE).

Advantageous Effects of Invention

In the piston for a vehicle disc brake according to the invention, the adhesiveness of the covering layer with respect to the piston main body is good, so high strength can be obtained and operation feeling is excellent.

In addition, in the manufacturing method for a piston for a vehicle disc brake according to the invention, it is possible to form the first plating layer having high adhesiveness with respect to the piston main body and form the second plating layer having high adhesiveness with respect to the first plating layer, so the covering layer having high adhesiveness with respect to the piston main body can be formed and operation feeling can be improved by the second plating layer.

BRIEF DESCRIPTION OF DRAWINGS

FIG. 1 is a cross sectional view illustrating a vehicle disc brake according to an embodiment of the invention.
FIG. 2 is an explanatory diagram illustrating the enlarged main part of the vehicle disc brake.
FIG. 3A illustrates the measurement results of an example.
FIG. 3B illustrates the measurement results of a comparative example.

DESCRIPTION OF EMBODIMENTS

One embodiment in which the invention is applied to a disc brake for a motorcycle will be described with reference to the drawings.

As illustrated in FIGS. 1 and 2, in a disc brake 1, a caliper body 3 is supported via a pair of slide pins (none of them are illustrated) by a caliper bracket fixed to the vehicle body in a side part of a disc rotor 2 so as to be movable in the disc shaft direction. The caliper body 3 includes an action section 3a and a reaction section 3b disposed so as to face each other on both sides of the disc rotor 2 and a bridge section 3c coupling them across the outer periphery of the disc rotor 2 and a pair of friction pads 4 and 4 is hung between the action section 3a and the reaction section 3b via a hanger pin 5 so as to be movable in the disc shaft direction.

A cylinder hole 6 is provided in the action section 3a so as to be opened toward the disc rotor 2 and a bifurcated reaction force claw 3d is formed in the reaction section 3b so as to sandwich both sides of the cylinder hole 6. A cup-shaped piston 7 is inserted into the cylinder hole 6 via a piston seal 8 and a dust seal 9 and a hydraulic chamber 10 is defined between the piston 7 and the bottom of the cylinder hole 6.

The piston seal 8 and the dust seal 9 are annular elastic bodies made of synthetic rubber or soft synthetic resin and the diameters of their inner peripheral surfaces are smaller than the diameter of the outer periphery of the piston 7. The outer peripheral surface of the piston 7 makes close contact with the inner peripheral surfaces of the piston seal 8 and the dust seal 9 to liquid-tightly seal the part from the piston seal 8 to the hydraulic chamber 10 and the dust seal 9 prevents dust and rain water from entering the gap between the cylinder hole 6 and the piston 7.

In the disc brake 1 as described above, when the hydraulic fluid is supplied to the hydraulic chamber 10 during braking, the piston 7 advances toward the disc rotor 2 in the cylinder hole 6 while elastically deforming the piston seal 8 and pushes a friction pad 4 close to the action section toward one side surface of the disc rotor 2. Next, as a reaction of this, the caliper body 3 moves toward the action section and the reaction force claw 3d pushes the friction pad 4 close to the reaction section toward the other side surface of the disc rotor 2 to perform an operational action. In addition, when the supply of the hydraulic fluid to the hydraulic chamber 10 is released, the piston 7 is retracted toward the bottom of the cylinder hole 6 due to the restoring force of the piston seal 8 and returns to a predetermined backward position.

As illustrated in FIG. 2, the piston 7 has a piston main body 71 made of aluminum alloy and a covering layer 20 formed on the outer surface of the piston main body 71. The covering layer 20 has a first plating layer 21 made of iron-phosphorous alloy formed on a surface 7a of the piston main body 71 and a second plating layer 22 made of nickel-phosphorous alloy formed on the first plating layer 21.

The film thickness of the first plating layer 21 is preferably 1 to 15 μm and more preferably 5 to 15 μm. When the film thickness of the first plating layer 21 falls within this range, it is possible to obtain high adhesiveness with respect to the piston main body 71 and keep predetermined hardness against a rise in the temperature of the piston 7 due to braking heat.

The film thickness of the second plating layer 22 is preferably 1 to 15 μm and more preferably 5 to 7 μm. When the film thickness of the second plating layer 22 falls within this range, it is possible to sufficiently endure a rise in the temperature of the piston 7 caused by braking heat. In addition, in the second plating layer 22, the amount of eutectoid of resin particles (for example, PTFE particles) is set to preferably the range from 10 to 30 volume percent and more preferably the range from 15 to 25 volume percent and the surface roughness thereof is preferably set to the range from 1 to 8 S. The "surface roughness" is defined by JIS B0601 (measurement method: maximum height roughness). Because of the second plating layer 22 of nickel-phosphorous alloy including such resin particles, the piston 7 has high non-adhesiveness and high slip characteristics with respect to the piston seal 8, thereby achieving excellent operation feeling. The function of the second plating layer 22 is described in detail in JP-A-11-63047 (Japanese Patent Application No. 9-214352).

Next, the manufacturing method for the covering layer 20 will be described.

The covering layer 20 is formed in the following process.

(A) Zincate Treatment (Pretreatment)

First, pretreatment such as degreasing treatment and zincate treatment is performed using a well-known method. This pretreatment removes the oxide film on the surface of the piston main body 71 and deposits zinc as a substitute. For example, the pretreatment etches the surface of aluminum alloy using an alkaline solution including sodium hydroxide and removes the oxide film. After that, zincate treatment is performed using a zincate solution (for example, the trade name "Albond" manufactured by WORLD METAL CO., LTD.) including zinc oxide. Zincate treatment may be performed more than once as necessary.

(B) Forming a First Plating Layer

Next, the first plating layer 21 made of iron-phosphorous alloy is formed using electrolytic plating. Such electrolytic plating can be performed under the following conditions. In the process for forming the first plating layer, it is possible to use a plating solution obtained by dissolving at least an iron compound, a phosphinic acid compound, and organic acid in a solvent such as water. As the iron compound, iron sulfate, iron chloride, and the like can be used. The phosphinic acid compound supplies phosphinic acid ions in the plating solution and can be, for example, hypophosphite, phosphorous acid, and phosphite and preferably hypophosphite. As the hypophosphite, sodium hypophosphite, potassium hypophosphite, and the like can be used. As the phosphite, sodium phosphite and the like can be used. As the organic acid, glycine, L-ascorbic acid, and the like can be used. As components of the plating solution, saccharin sodium, urea, and the like can be used other than above.

An example of the composition of the plating solution is shown below.

Composition of Plating Solution:

| Ferrous chloride hydrate | 15 to 400 g/l |
| Sodium hypophosphite hydrate | 1 to 60 g/l |
| Glycine | 2 to 20 g/l |
| L-ascorbic acid | 5 to 90 g/l |
| Water | Other |

For example, the following conditions can be used as the plating conditions.

Plating Conditions:

| Temperature | 10 to 60° C. |
| Time | 5 to 60 minutes |
| pH | 1 to 4 |
| Current density | 1 to 1.5 A/dm$^2$ |

(C) Forming Second Plating Layer

The second plating layer 22 made of nickel-phosphorous alloy is formed by electroless plating using an electroless plating solution. Such an electroless plating solution preferably includes resin particles made of, for example, polytetrafluoroethylene (PTFE). The second plating layer preferably includes 10 to 30 volume percent of resin particles. As such an electroless plating solution, for example, the commercial item "NIMUFLON T" (manufactured by Uyemura Co., Ltd.) can be used. The commercial item "NIMU- FLON T" includes 85 to 87 weight percent of nickel and 8 to 10 weight percent of phosphorus, and 21±3 volume percent of PTFE.

When using "NIMUFLON T" described above, for example, the following plating conditions can be used.

| Temperature | 80 to 95° C. |
| Time | 40 to 50 minutes |

The formation methods for the first plating layer 21 and the second plating layer 22 are not limited to the above ones and plating using a known plating solution may be used as long as predetermined plating layers of iron-phosphorous alloy and nickel-phosphorous alloy are obtained.

In the manufacturing method according to the embodiment, by forming the first plating layer 21 made of iron-phosphorous alloy using electrolytic plating and then forming the second plating layer 22 made of nickel-phosphorous alloy using electroless plating after well-known zincate treatment (pretreatment) is performed, the piston main body 71, the first plating layer 21, and the second plating layer 22 mutually have high adhesiveness and the covering layer 20 has high peel resistance. As a result, the piston 7 according to the embodiment has high strength because of good adhesiveness of the covering layer 20 with respect to the piston main body 71 and provides excellent operation feeling.

EXAMPLE

Although an example of the invention will be described below, the invention is not limited to this example.
(A) Sample
(1) Sample for the Example A sample for the example was created in the following method.

First, a piston main body (that has an outer diameter of 30 mm, an inner diameter of 26 mm, and a shaft length of 22 mm and is made of aluminum alloy having the alloy number A6061 defined by JIS H4000) of aluminum alloy having the same shape as the piston main body 71 in FIG. 1 was degreased and etched using a known method and then subject to zincate treatment using the zincate solution "Albond250" (manufactured by WORLD METAL CO., LTD.). Next, electrolytic plating was performed using the following plating solution and plating conditions to form the first plating layer 21 made of iron-phosphorous alloy on the surface of the aluminum alloy plate. The film thickness of this first plating layer 21 was 12 μm.

Plating Solution:

| $FeCl_2 \cdot 4H_2O$ | 298 g/l |
| Sodium hypophosphite hydrate | 10 g/l |
| Glycine | 11 g/l |
| L-ascorbic acid | 35 g/l |
| Water | Other |

Plating Condition:

| Temperature | 30° C. |
| Time | 45 minutes |
| pH | 3 |
| Current density | 1.0 A/dm$^2$ |

Next, electroless plating was performed using the commercial electroless plating solution (the trade name "NIMUFLON T" manufactured by Uyemura Co., Ltd.) to form the second plating layer 22 made of nickel-phosphorous alloy. The film thickness of the second plating layer was 5 μm. In addition, in the second plating layer 22, the amount of eutectoid of PTFE particles was 21 volume percent. In addition, the surface roughness R defined by JIS B0601 of the second plating layer 22 was 2 μm. It should be noted that the temperature of the plating solution and the plating time were appropriately set to 80 to 95° C. and 40 to 50 minutes so as to meet the above film thickness.

(2) Sample for the Comparative Example

The sample for the comparative example was created in the following method.

Electroless plating was performed using the commercial electroless plating solution (the trade name "NIMUDEN KTY" manufactured by Uyemura Co., Ltd.) to form the first plating layer having a thickness of 12 μm made of nickel-phosphorous alloy. It should be noted that "NIMUDEN KTY" includes 89 to 91 weight percent of nickel and 9 to 11 weight percent of phosphorus.

Next, electroless plating was performed using the commercial electroless plating solution (the trade name "NIMUFLON T" manufactured by Uyemura Co., Ltd.) to form the second plating layer made of nickel-phosphorous alloy. This second plating layer was substantially the same as the second plating layer in the example and the film thickness was 5 μm, the amount of eutectoid of PTFE particles was 21 volume percent, and the surface roughness R defined by JIS B0601 was 2 μm. It should be noted that the temperature of the plating solution and the plating time were appropriately set to 80 to 95° C. and 40 to 50 minutes so as to be substantially identical to the film thickness of the plating layer in the example.

(B) Thermal Shock Test of Samples and the Results Thereof

The plating adhesiveness test of samples in the example and the comparative example was performed.

The adhesiveness test was performed according to JIS H8504 thermal shock test method. This test checked the adhesiveness of plating via thermal shocks caused when samples are heated and rapidly cooled. Specifically, the inside of the heating furnace was heated to 300° C. and a sample was put in the furnace. Next, the sample was kept at 300° C. for 30 minutes, the sample is taken out of the furnace, and the sample was quenched in water at room temperature. The surface of the sample obtained as described above was observed visually. The images obtained as a result of the test are illustrated in FIGS. 3A and 3B. FIG. 3A illustrates the image of the sample of the example and FIG. 3B illustrates the image of the sample of the comparative example.

As is clear from FIG. 3A, peel of the plating layer was not observed in the sample of the example. In contrast, as is clear from FIG. 3B, peel of the plating layer was observed in the region surrounded by the ring in the sample of the comparative example.

As described above, the adhesiveness of the covering layer in the example of the invention is much better than in the comparative example (conventional example).

REFERENCE SIGNS LIST

1: disc brake
2: disc rotor
3: caliper body
3a: action section

3b: reaction section
3c: bridge section
3d: reaction force claw
4: friction pad
5: hanger pin
6: cylinder hole
7: piston
71: piston main body
7a: outer peripheral surface
8: piston seal
9: dust seal
10: hydraulic chamber
20: covering layer
21: first plating layer
22: second plating layer

The invention claimed is:

1. A piston for a vehicle disc brake, the piston being accommodated via a piston seal in a cylinder hole formed in a caliper body of the vehicle disc brake so as to be movable in a disc shaft direction, the piston comprising:
   a piston main body made of aluminum alloy; and
   a covering layer formed on an outer surface of the piston main body, wherein
      the covering layer includes a first plating layer made of iron-phosphorous alloy and a second plating layer made of nickel-phosphorous alloy,
      the outer surface of the piston main body having undergone a zincate treatment before the formation of first plating layer of the covering layer thereon, and
      the second plating layer being formed on the first plating layer.

2. The piston for a vehicle disc brake according to claim 1,
   wherein the second plating layer further includes 10 to 30 volume percent of resin particles and the resin particles are made of polytetrafluoroethylene (PTFE).

3. The piston for a vehicle disc brake according to claim 1,
   wherein the first plating layer has a film thickness of 1 to 15 μm and the second plating layer has a film thickness of 1 to 15 μm.

4. A method for manufacturing a piston for a vehicle disc brake, the piston being accommodated via a piston seal in a cylinder hole formed in a caliper body of the vehicle disc brake so as to be movable in a disc shaft direction, the method comprising the steps of:
   forming a first plating layer made of iron-phosphorous alloy on an outer surface of a piston main body made of aluminum alloy using electrolytic plating, the outer surface having undergone zincate treatment; and
   forming a second plating layer made of nickel-phosphorous alloy on a surface of the first plating layer using electroless plating.

5. The method for manufacturing a piston for a vehicle disc brake according to claim 4,
   wherein a plating solution including an iron compound, a phosphinic acid compound, and organic acid is used in the process of forming the first plating layer.

6. The method for manufacturing a piston for a vehicle disc brake according to claim 5,
   wherein the organic acid is glycine and L-ascorbic acid.

7. The method for manufacturing a piston for a vehicle disc brake according to claim 4,
   wherein the second plating layer further includes 10 to 30 volume percent of resin particles and the resin particles are made of polytetrafluoroethylene (PTFE).

8. The piston for a vehicle disc brake according to claim 2,
   wherein the first plating layer has a film thickness of 1 to 15 μm and the second plating layer has a film thickness of 1 to 15 μm.

9. The method for manufacturing a piston for a vehicle disc brake according to claim 5,
   wherein the second plating layer further includes 10 to 30 volume percent of resin particles and the resin particles are made of polytetrafluoroethylene (PTFE).

10. The method for manufacturing a piston for a vehicle disc brake according to claim 6,
    wherein the second plating layer further includes 10 to 30 volume percent of resin particles and the resin particles are made of polytetrafluoroethylene (PTFE).

* * * * *